(12) United States Patent
Sicot et al.

(10) Patent No.: US 10,850,748 B2
(45) Date of Patent: Dec. 1, 2020

(54) ELECTRICAL EQUIPMENT COMPARTMENT FOR INTEGRATION IN A DEFORMABLE DRIVER CABIN FOR AN URBAN RAILWAY VEHICLE

(71) Applicant: ALSTOM Transport Technologies, Saint-Ouen (FR)

(72) Inventors: Patrick Sicot, Reichshoffen (FR); Jean-Luc Renverse, Marly (FR); Mario Fogli, Roeulx (FR); Arnauld Robyn, Saint Saulve (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 267 days.

(21) Appl. No.: 16/062,201

(22) PCT Filed: Dec. 18, 2015

(86) PCT No.: PCT/IB2015/002625
§ 371 (c)(1),
(2) Date: Jun. 14, 2018

(87) PCT Pub. No.: WO2017/103646
PCT Pub. Date: Jun. 22, 2017

(65) Prior Publication Data
US 2018/0370547 A1    Dec. 27, 2018

(51) Int. Cl.
*B61C 17/04* (2006.01)
*B61D 17/04* (2006.01)

(52) U.S. Cl.
CPC .............. *B61C 17/04* (2013.01); *B61D 17/04* (2013.01); *B61D 17/041* (2013.01); *Y02T 30/34* (2013.01)

(58) Field of Classification Search
CPC .......... B61C 17/00; B61C 17/04; B61C 17/06
See application file for complete search history.

(56) References Cited

U.S. PATENT DOCUMENTS

2004/0129169 A1* 7/2004 Bolinth .................. B61D 15/06
                                                                  105/342
2014/0305333 A1* 10/2014 Tai .......................... B61C 17/04
                                                                  105/26.05

FOREIGN PATENT DOCUMENTS

AU    2003203693 A1    11/2004
EP    2407367 A2    1/2012

OTHER PUBLICATIONS

International Search Report for PCT/IB2015/002625 dated Sep. 6, 2018.

(Continued)

*Primary Examiner* — Robert J McCarry, Jr.
(74) *Attorney, Agent, or Firm* — Pearne & Gordon LLP

(57) ABSTRACT

A driver cabin for an urban railway vehicle, the driver cabin extending in a longitudinal driving direction and including: a cabin chassis including at least one main shock-absorbing area having a longitudinal extend defined between a front plane oriented transversally to the longitudinal driving direction and a rear plane oriented transversally to the longitudinal driving direction, the main shock-absorbing area being able to deform in case of a shock between an initial state and a shock-absorbed state, so that in the shock-absorbed state the longitudinal extend of the main shock-absorbing area is reduced about a predefined compression distance; an electrical equipment compartment storing at least one stiff electrical element carrying electronic components. The electrical equipment compartment is located inside the main shock-absorbing area.

12 Claims, 3 Drawing Sheets

(56) References Cited

OTHER PUBLICATIONS

Figure 2:
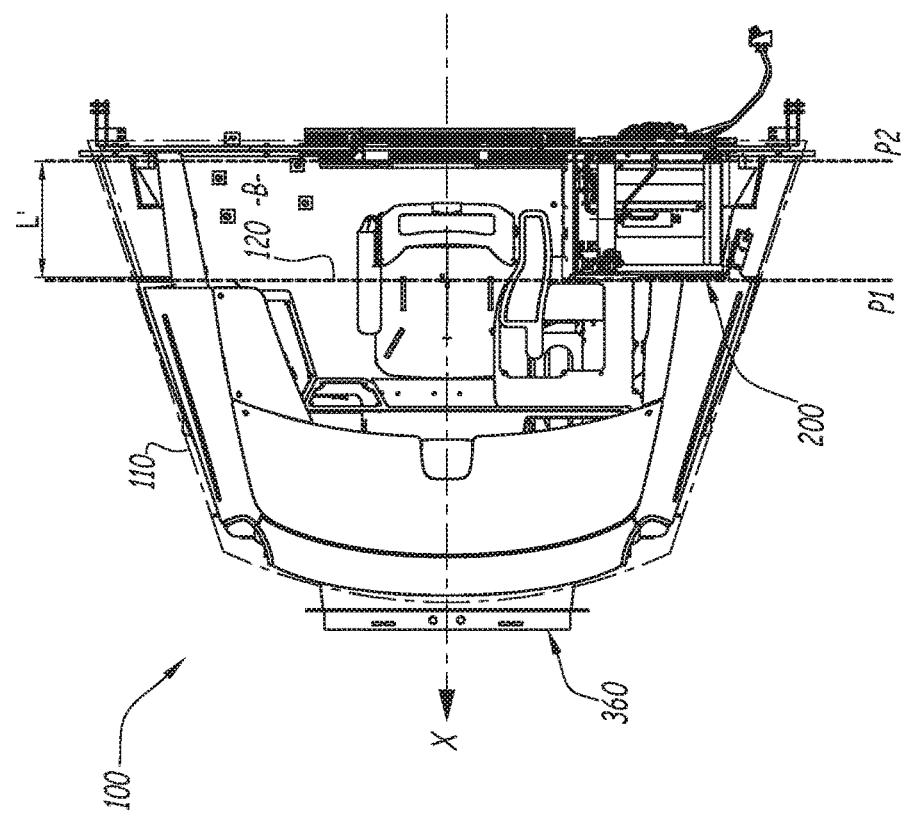

International Written Opinion for PCT/IB2015/002625 dated Sep. 6, 2018.

* cited by examiner

ELECTRICAL EQUIPMENT COMPARTMENT FOR INTEGRATION IN A DEFORMABLE DRIVER CABIN FOR AN URBAN RAILWAY VEHICLE

This application is a National Stage application of PCT international application PCT/IB2015/002625, filed on Dec. 18, 2015, which are incorporated herein by reference in their entirety.

The present invention relates to an electrical equipment compartment for integration in a deformable driver cabin for an urban railway vehicle.

It is already known from state of the art a driver cabin for an urban railway vehicle, said driver cabin extending in a longitudinal driving direction and comprising:
- a cabin chassis including at least one main shock-absorbing area having a longitudinal extend defined between a front plane oriented transversally to the longitudinal driving direction and a rear plane oriented transversally to the longitudinal driving direction, the main shock-absorbing area being able to deform in case of a shock between an initial state and a shock-absorbed state, so that in the shock-absorbed state the longitudinal extend of the main shock-absorbing area is reduced about a predefined compression distance;
- an electrical equipment compartment storing at least one stiff electrical element carrying electronic components.

However, such a driver cabin does not provide fully satisfaction to highest security standards; especially the requirements of crashworthiness standards are not fulfilled. Indeed, in the case of a frontal collision of the driver cabin with an object, the driver cabin only badly absorbs the shock-energy of the collision. This provokes the transmission of high shock-energy from the driver cabin throughout the whole urban railway vehicle, including the passenger section. Therefore, passengers of the urban railway vehicle are exposed to severe injuries. In consequence, it is important for an urban railway vehicle, to satisfy the requirements of crashworthiness standards.

One solution could be to integrate shock-absorbing organs in the driver cabin, as it is known from railway vehicles used in long distance transportation. But in such a case, the electronic equipment compartment and the components found therein, which is located in the driver cabin of urban railway vehicle, will be compressed during a collision, and therefore influence negatively the shock-absorption characteristic of the shock-absorbing organs.

To resolve this problem, one could locate the electronic equipment compartment outside the driver cabin. However, it is crucial for urban railway vehicles to not reduce the ratio of passengers seats per railway vehicle length because of the limited space provided in urban environments.

Accordingly, it is an object of the invention to provide a railway vehicle which guarantees high security for passengers during collision of the urban railway vehicle, without reducing the passenger load per vehicle length.

This object is achieved with a driver cabin characterized in that the electrical equipment compartment is located inside the main shock-absorbing area,
- each stiff electrical element is substantially planar and substantially oriented in a transverse direction relative to the longitudinal driving direction,
- the electrical equipment compartment comprises at least one deformation space extending in the longitudinal driving direction along an initial length, the sum of the initial lengths of the at least one deformation space being superior to the predefined compression distance.

The advantage of a driver cabin for an urban railway vehicle according to the invention is that the ratio of passenger seats per railway vehicle length is not reduced because all equipment of the driver cabin remains inside the driver cabin. Furthermore, the security of the passenger is improved during collision because the shock-absorbing organs are integrated into the driver cabin.

Locating the electrical equipment compartment inside the main shock-absorbing area allows not to increase the driver cabin length, but to optimize usage of the space initially provided by the driver cabin.

The transverse orientation of the substantially planar stiff electrical element allows providing a deformation space inside the electrical equipment compartment. The deformation space of the electrical equipment compartment guarantees that the electrical equipment compartment can be compressed during a collision without disturbing the compression behavior of the shock-absorbing organs.

The electrical equipment compartment with the deformation space allows a minimum of influence on the shock-absorbing organs during a collision because the stiff electrical elements inside the electrical equipment compartment are not compressed. The electrical equipment compartment with the deformation space guarantees a predicted crush behavior of the driver cabin.

Therefore, the requirements of the crashworthiness standards are fulfilled. In consequence, the passengers are protected of severe shocks by the shock-absorbing organs.

According to preferred embodiments, the inventive driver cabin comprises one or more of the following features, in all technically possible combinations:
- at least one deformation space only contains elements configured to deform simultaneously with the absorption-area when receiving a shock, such as flexible or frangible elements, or is devoid of any elements;
- the cabin chassis includes at least a first side section and a second side section, symmetrically arranged around the longitudinal driving direction, the first and second side sections comprise each at least one main shock-absorbing organ symmetrically arranged around the longitudinal driving direction, the main shock-absorbing organs defining the main shock-absorbing area;
- the at least one stiff electrical element comprises at least one first stiff electrical element carried by the main shock-absorbing organ of the first or second side section;
- the cabin chassis including a rear section extending parallel to the rear plane, and wherein the at least one stiff electrical element comprises at least one second stiff electrical element carried by the rear section;
- the at least one stiff electrical element comprises a first and a second stiff electrical elements, distant from each other of approximately the compression distance;
- a security space distance is arranged adjacent to the electrical equipment compartment, the security space distance extending from the front plane into the longitudinal driving direction;
- the electrical equipment compartment comprises flexible cover panels, the flexible cover panels being configured to deform simultaneously with the shock-absorbing area when receiving a shock; and
- each cover panel is made out of aluminum and has a thickness about 0.6 mm.

The invention also concerns an urban railway vehicle comprising a driver cabin according to any one of the previous claims.

Figure 1:
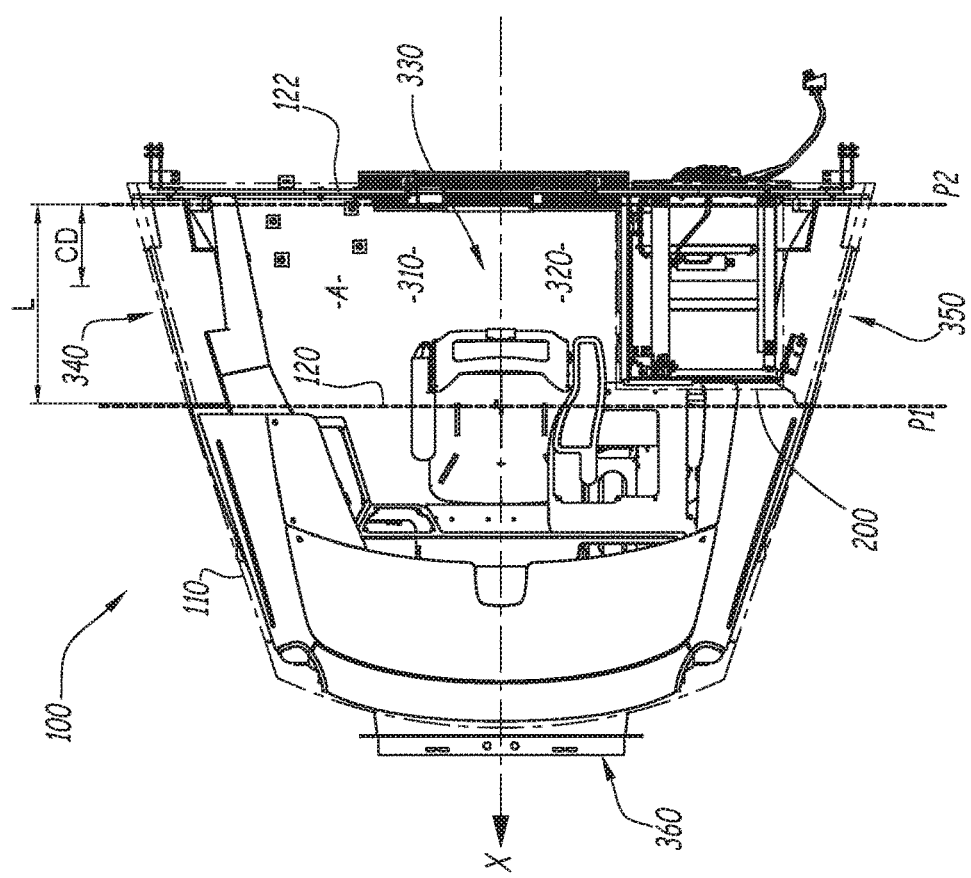
Figure 3:
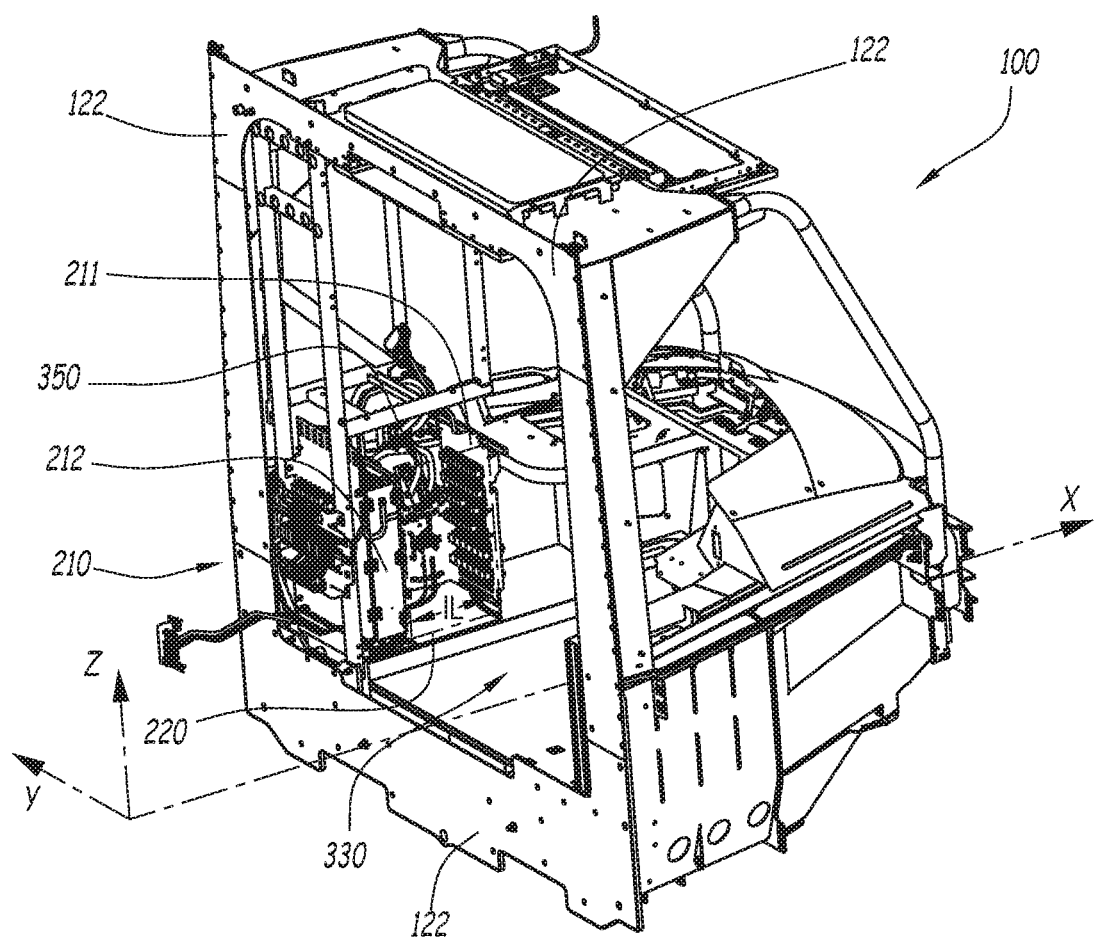

Exemplary embodiments of the invention will now be described in detail with reference to the drawings, wherein:

FIG. 1 presents a top view of the driver cabin of an urban railway vehicle according to the invention;

FIG. 2 is a top view of the driver cabin of FIG. 1 after a collision impact;

FIG. 3 presents a isometric view of the driver cabin of FIG. 1; and

Figure 4:
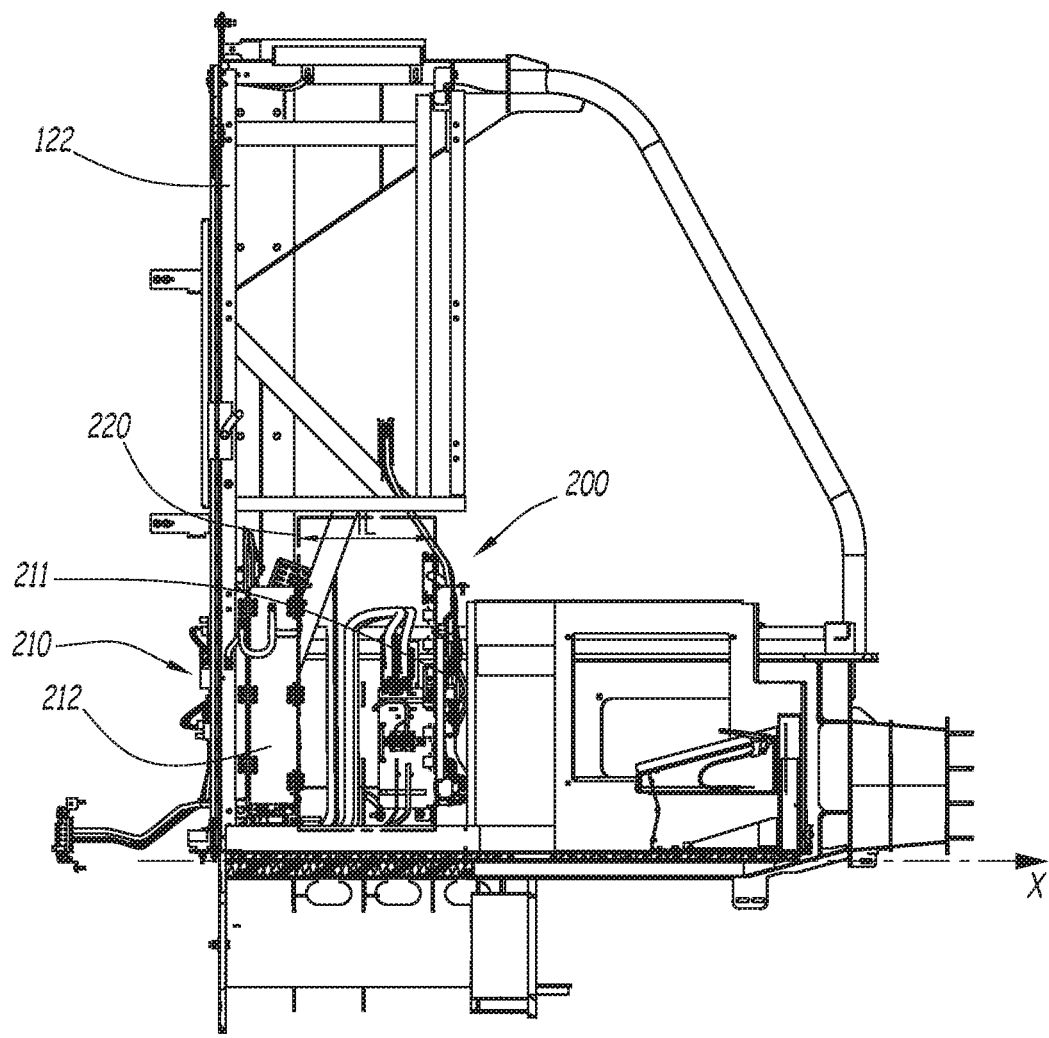

FIG. 4 illustrates a side view of the driver cabin of FIG. 1.

With reference to FIG. 1, there is shown a top view of a driver cabin 100 of an urban railway vehicle according to the invention having a longitudinal driving direction X.

The driver cabin 100 is extending in the longitudinal driving direction X. The driving cabin 100 comprises a cabin chassis 110 which includes at least one main shock-absorbing area 120.

The main shock-absorbing area 120 extends in the longitudinal direction X between a front plane P1 and a rear plane P2, and it has a longitudinal extend L in this longitudinal direction. The front P1 and rear P2 planes are oriented transversally to the longitudinal driving direction X. The main shock-absorbing area 120 extends transversally throughout the cabin chassis 110.

The cabin chassis 110 including a rear section 122 extending parallel to the rear plane P2. The rear section 122 is not part of the main shock-absorbing area 120.

The main shock-absorbing area 120 can be deformed in case of a frontal collision of the driver cabin 100 with an object, for example a car (not shown). Such a collision produces a shock on the driver cabin 100 oriented parallel to the longitudinal driving direction X.

In such a case, the main shock-absorbing area 120 shown in FIG. 1 is deformed from an initial state A to a shock-absorbed state B shown in FIG. 2.

In the shock-absorbed state B, the shock-absorbing area 120 has a longitudinal extend L' that is reduced about a predefined compression distance CD.

The predefined compression distance CD depends on the amount of energy aimed to be absorbed during a collision. In other words, the more energy the shock-absorbing area 120 is supposed to be exposed, the more the compression distance CD needs to extend longitudinally in order to provide sufficient security to the passengers of the railway vehicle.

The cabin chassis 110 includes at least a first side section 310 and a second side section 320. The first 310 and second 320 side sections are symmetrically arranged around a median plane parallel to the longitudinal driving direction X.

The first 310 and second 320 side sections are each extending in a floor section 330 of the driver cabin 100. The floor section 330 is extending in a plane parallel to the driving direction X and parallel to a transversal direction Y perpendicular to the driving direction X.

The first side section 310 is further extending in a first lateral section 340 orientated substantially perpendicular to the floor section 330.

The second side section 320 is further extending in a second lateral section 350 orientated substantially perpendicular to the floor section 330.

Each of the first 310 and second 320 side sections comprises at least one main shock-absorbing organ (not shown) which is symmetrically arranged around said median plane parallel to the longitudinal driving direction X.

The main shock-absorbing organs define the main shock-absorbing area 120.

The main shock-absorbing organs are configured to absorb a shock generated by a frontal collision of the driver cabin 100 with an obstacle. According to the preferred embodiment, the shock-absorbing organs are configured to absorb a maximum shock corresponding to a shock induced by a frontal collision between a standing object and the urban railway vehicle running at a speed of at least 40 km per hour.

The shock-absorbing organs can also be configured to not absorb a shock corresponding to a shock induced by a frontal collision between a standing object and the urban railway vehicle running at a speed lower than 8 km per hour. In such a case, the main shock-absorbing area 120 is not deformed in case of a collision.

The urban railway vehicle 100 may have a bumper 360 configured to absorb a shock generated by a frontal collision between an object and the urban railway vehicle, each urban railway vehicle running at a speed lower than 8 km per hour.

The main shock-absorbing organs can be formed out of structural elements being part for example of the cabin chassis 110, having predetermined folding points and/or enfeebled areas. The main shock-absorbing organs can be configured to have less yield strength than the cabin chassis 110 situated outside the shock-absorbing area 120.

The main shock-absorbing organs are configured to absorb a shock produced during a collision of an object with the driver cabin 100. The shock-absorbing organs allow predefined shock absorption for shocks directed along the longitudinal driving direction X on the driver cabin 100.

The main shock-absorbing organs have an initial state A, corresponding to a driver cabin 100 which was not exposed to a shock, and a shock-absorbed state B after the driver cabin 100 was exposed to a shock oriented parallel to the longitudinal driving direction X.

The driver cabin 100 further comprises an electrical equipment compartment 200 located inside the main shock-absorbing area 120. Locating the electrical equipment compartment 200 inside the main shock-absorbing area 120 allows not to increase the driver cabin length, but to optimize usage of the space initially provided by the driver cabin.

The electrical equipment compartment 200 is configured for storing at least one stiff electrical element 210 carrying electronic components. An object or element is considered to be stiff if a force for deformation of the object in a direction parallel to the longitudinal driving direction X exceeds 10% of a deformation force necessary to deform the main shock-absorbing area 120.

As can be seen in detail in FIG. 4, each stiff electrical element 210 is substantially planar and substantially oriented in a transverse direction relative to the longitudinal driving direction X. The electrical equipment compartment 200 is also configured for storing flexible electrical elements (not shown), for example cables. An object or element is considered to be flexible if a force for deformation of the object in a direction parallel to the longitudinal driving direction X is lower than 5% of the deformation force necessary to deform the main shock-absorbing area 120.

The stiff electrical elements 210 comprise at least one first stiff electrical element 211 carried by the first lateral section 340 or the second lateral section 350. The first stiff electrical element 211 has no direct mechanical contact with the floor section 330.

The stiff electrical elements 210 comprise at least one second stiff electrical element 212 carried by the rear section 122 of the cabin chassis 110. The second stiff electrical element 212 is free of fixations to the floor section 330.

The second stiff electrical element 212 may extend into the main shock-absorbing area 120.

The first 211 and second 212 stiff electrical elements are distant from each other of approximately the compression distance CD.

Further, the electrical equipment compartment 200 comprises at least one deformation space 220 extending parallel to the longitudinal driving direction X. The deformation space 220 is located adjacent to at least one of the stiff electrical elements 210.

The deformation space 220 has at least one initial length IL, the one initial length IL or sum of the initial lengths IL of the at least one deformation space 220 being superior to the predefined compression distance CD (see FIGS. 3 and 4). In other words, in case that for example a third stiff electrical element or more stiff electrical elements are located in the electrical equipment compartment 200, the deformation space 220 can be split in between the stiff electrical elements such that the sum of all initial lengths IL of the sections of the deformation space 220 are superior to the predefined compression distance CD.

The deformation space 220 is configured to deform simultaneously with the main shock-absorbing area 120 during a collision. The deformation of the deformation space 220 does not influence the deformation of the main shock-absorbing area 120.

The deformation space 220 only contains flexible elements which do not influence the deformation of the main shock-absorbing area 120. The deformation space 220 can also be devoid of any elements. The flexible elements can be flexible electrical elements as power cables, data cables or other flexible components.

This allows that the predicted deformation of the driver cabin 100 is guaranteed, in the case of a collision of the driver cabin 100 with an object.

The flexible elements also include flexible cover panels (not shown) intended to close the electrical equipment compartment 200. The flexible cover panels are configured to deform simultaneously with the shock-absorbing area 120 during a collision. The material of the cover panel is easily deformable when exposed to a shock.

Each cover panel is for example made out of aluminum and has a thickness about 0.6 mm.

It should be noted that the invention is not limited to the above embodiments.

What is claimed is:

1. A driver cabin for an urban railway vehicle, said driver cabin extending in a longitudinal driving direction and comprising:
a cabin chassis including at least one main shock-absorbing area having a longitudinal extent defined between a front plane oriented transversally to the longitudinal driving direction and a rear plane oriented transversally to the longitudinal driving direction, the main shock-absorbing area configured to deform in case of a shock between an initial state and a shock-absorbed state, so that in the shock-absorbed state the longitudinal extent of the main shock-absorbing area is reduced along a predefined compression distance;
an electrical equipment compartment storing at least one stiff electrical element carrying electronic components, the at least one stiff electrical element having a force for deformation in a direction parallel to the longitudinal driving direction exceeding 10% of a deformation force necessary to deform the main shock-absorbing area;
wherein:
the electrical equipment compartment is located inside the main shock-absorbing area,
the at least one stiff electrical element is substantially planar and substantially oriented in a transverse direction relative to the longitudinal driving direction,
the electrical equipment compartment comprises at least one deformation space extending in the longitudinal driving direction along an initial length, the sum of the initial lengths of the at least one deformation space being greater than the predefined compression distance.

2. The driver cabin of claim 1, wherein said at least one deformation space only contains elements configured to deform simultaneously with the main shock-absorbing area when receiving a shock or is devoid of such elements.

3. The driver cabin of claim 1, wherein the cabin chassis includes at least a first side section and a second side section, symmetrically arranged around the longitudinal driving direction, the first and second side sections comprise each at least one main shock-absorbing organ symmetrically arranged around the longitudinal driving direction, the main shock-absorbing organs defining the main shock-absorbing area.

4. The driver cabin of claim 3, wherein the at least one stiff electrical element comprises at least one first stiff electrical element carried by the main shock-absorbing organ of the first or second side section.

5. The driver cabin of claim 1, wherein the cabin chassis includes a rear section extending parallel to the rear plane, and wherein the at least one stiff electrical element comprises at least one second stiff electrical element carried by the rear section.

6. The driver cabin of claim 1, wherein the at least one stiff electrical element comprises a first and a second stiff electrical elements, distant from each other of approximately the compression distance.

7. The driver cabin of claim 1, wherein the electrical equipment compartment comprises flexible cover panels, the flexible cover panels being configured to deform simultaneously with the main shock-absorbing area when receiving a shock.

8. The driver cabin of claim 7, wherein each cover panel is made out of aluminum and has a thickness about 0.6 mm.

9. An urban railway vehicle comprising a driver cabin according to claim 1.

10. The driver cabin of claim 1, wherein the elements of the at least one deformation space configured to deform simultaneously with the main shock-absorbing area when receiving a shock are frangible elements and/or flexible elements configured to deform in response to the shock.

11. The driver cabin of claim 1, wherein the cabin chassis further includes a secondary area disposed longitudinally adjacent the at least one main shock-absorbing area.

12. The driver cabin of claim 1, wherein the cabin chassis further includes a secondary area disposed adjacent the at least one main shock-absorbing area, the secondary area and the at least one main shock-absorbing area each extending along a chassis longitudinal extent of the cabin chassis, wherein the longitudinal extent of the at least one main shock-absorbing area extends generally parallel to the chassis longitudinal extent, and wherein, in case of a shock, the cabin chassis is configured such that a majority of reduction of the cabin chassis along the chassis longitudinal extent is provided by the main shock-absorbing area being configured to be reduced along its longitudinal extent.

\* \* \* \* \*